(12) United States Patent
Deck

(10) Patent No.: US 8,111,392 B1
(45) Date of Patent: Feb. 7, 2012

(54) RAMAN SPECTROMETER WITH DISPLAY OF LASER POWER AT THE SAMPLE

(75) Inventor: Francis J. Deck, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 374 days.

(21) Appl. No.: 12/032,889

(22) Filed: Feb. 18, 2008

(51) Int. Cl.
*G01J 3/44* (2006.01)

(52) U.S. Cl. ........................................................ 356/301

(58) Field of Classification Search .................... 356/301
See application file for complete search history.

(56) References Cited

U.S. PATENT DOCUMENTS

| 5,557,544 A * | 9/1996 | Simon et al. ..................... 702/77 |
| 2004/0154988 A1 * | 8/2004 | Sheets, Sr. ..................... 210/718 |

\* cited by examiner

*Primary Examiner* — Tarifur Chowdhury
*Assistant Examiner* — Abdullahi Nur

(74) *Attorney, Agent, or Firm* — Michael C. Staggs

(57) ABSTRACT

A Raman optical method and apparatus is utilized to automatically and accurately recognize laser power measurements made at a desired illumination sample plane. From such a configuration, the methods and systems disclosed herein, enable the support of multiple optical wavelengths coupled with essential components, such as, but not limited to, filters, objectives, reflectors, etc., to provide the capability of displaying and controlling the optical power at the desired sample plane through storage of power calibration factors that are associated with such components. In particular, the system utilized herein, can recognize the installation of components and recalls stored calibration factors that are associated with such components to ensure an accurate power measurement at the illuminated sample plane.

14 Claims, 2 Drawing Sheets

RAMAN SPECTROMETER WITH DISPLAY OF LASER POWER AT THE SAMPLE

BACKGROUND OF THE INVENTION

1. Field of the Invention

The present invention relates to optical spectroscopy. More particularly, the present invention relates to an optical method and apparatus for automatically providing a controlled and displayed power at a desired sample plane using calibrated wavelengths and optical characteristics of a system.

2. Discussion of the Related Art

When illuminating light, such as a laser beam, is incident upon a sample material, molecular bonds in the material can be excited by the incident light and can emit radiation which can be detected as scattered light. The Rayleigh component of the scattered light corresponds to the light emitted when the molecule relaxes from the excited state to the ground state. Infrequently, the molecule relaxes to a different vibrational or rotational level in the ground state. This produces Raman scattering components at Stokes and Anti-Stokes frequencies. A sample composed of multiple molecular species will produce a spectrum of such Raman scattering. The Raman scattering components can be detected and analyzed to help determine the composition of the sample.

Various apparatus have been developed for analyzing Raman spectra including Raman microscopes in which a very small area on a sample can be analyzed to determine characteristics of the composition of the sample at that area. In a typical Raman microscope, narrow band or monochromatic illuminating light, such as from a laser, is passed along a beam path through the objective lens of the microscope where it is focused at a focal point on a specimen. The intensity of the induced Raman scattered radiation is proportional to the applied optical intensity produced by the focused beam at the sample, wherein such induced radiation from the sample is collected by the microscope objective and is passed back on a beam path to a spectrograph, which typically separates the Raman scattering radiation by wavelength and detects it. Optical elements are typically included in the excitation beam path and the returning Raman radiation beam path to separate the excitation light from the Raman scattering light and to filter out the Rayleigh light from the beam directed to the spectrograph.

Available commercial instruments do not directly measure such focused illumination optical power at the plane of interest when characterizing a sample in a spectrometer. Such a measurement often requires removing the positioned sample either prior to and/or after optical interrogation in order to insert a detector at the optical plane of interest. Such a procedure captures the intensity of the beam that was desired to be applied during the actual measurement procedure.

To overcome removing the positioned sample, it is conventional to estimate optical power at the illumination plane of interest by simply displaying a percentage of the total laser power. This has the disadvantage that the actual laser power is unknown and has the consequence of the applied power changing as the power level declines through the service life of the laser.

Another method that has been utilized to resolve the aforementioned problem includes configuring an internal power meter, such as a beam-splitter and detector, with a single point calibration factor to estimate power at the sample. However, this has the disadvantage that different desired application wavelengths when coupled with components and accessories whose optical properties vary due to inherent and induced wavelength dependencies, may and often do affect the actual applied power at the desired sample plane, which is unaccounted for by a single point calibration.

Accordingly, a novel Raman spectrograph capable of supporting multiple laser wavelengths that includes interchangeable optical components with the ability to display and control optical power at the sample plane is needed. The present invention is directed to such a need.

SUMMARY OF THE INVENTION

In accordance with the present invention, an optical apparatus is utilized herein that can automatically and accurately recognize laser power measurements made at a desired illumination sample plane. Accordingly, such a novel configuration enables the support of multiple optical wavelengths coupled with essential components, such as, but not limited to, filters, objectives, reflectors, etc., to provide the displaying and controlling of the optical power at the desired sample plane through storage of power calibration factors that are associated with such components.

Another aspect of the present invention is directed to a Raman method for automatically controlling and displaying the power at a desired sample plane for a spectrometer system, including: obtaining a respective data set that includes optical characteristics of one or more secured optical components and one or more inter-changeable optical components to be utilized in the system; storing the respective data set of said optical characteristics within at least one machine readable/accessible medium selected from: a floppy disk, a flash drive, an optical compact disc, a magnetic disc, an optical storage disk, a magneto-optical disk, a read-only-memory (ROM), an electrically programmable read-only-memory (EPROM), an electrically erasable programmable read-only-memory (EEPROM), a hardware circuitry, and a random access memory (RAM); inputting a desired optical power level to be directed to an optical sample plane; measuring an applied optical power; reading the respective data set from the at least one machine readable/accessible medium; and automatically providing an increase or decrease of the applied power based on reading the respective data set from the at least one medium of identified one or more secured optical components and the one or more inter-changeable optical components so that the applied power is substantially equal to the desired input power level.

A final aspect of the present invention entails a Raman method for automatically controlling and displaying the power at a desired sample plane for a spectrometer system, including: obtaining optical characterization data of one or more secured optical components and one or more inter-changeable optical components to be utilized in the system; coupling one or more nonvolatile memory devices with desired secured optical components and/or inter-changeable optical components; storing the optical characterization data within respective nonvolatile memory devices; inputting a desired optical power level to be directed to an optical sample plane; measuring an applied optical power; reading optical characterization data from the nonvolatile memory devices of identified secured optical components and/or said inter-changeable optical components; and automatically providing an increase or decrease of applied power based on the reading of the optical characterization data so that the applied power is substantially equal to the desired input power level.

Accordingly, the present invention provides for an accurate measurement and thus application of the laser power at a desired sample plane on an instrument that allows a user to exchange optical components, such as, but not limited to, optical sources (lasers), filter sets, objectives, and sampling optics, etc., with automated recall of calibration parameters. Such methods as disclosed herein, provides for a user friendly, cost efficient system based on technical feasibility.

BRIEF DESCRIPTION OF THE DRAWINGS

The accompanying drawings, which are incorporated into and constitute a part of the specification, illustrate specific embodiments of the invention and, together with the general description of the invention, and the detailed description of the specific embodiments, serve to explain the principles of the invention.

DETAILED DESCRIPTION

Figure 1:
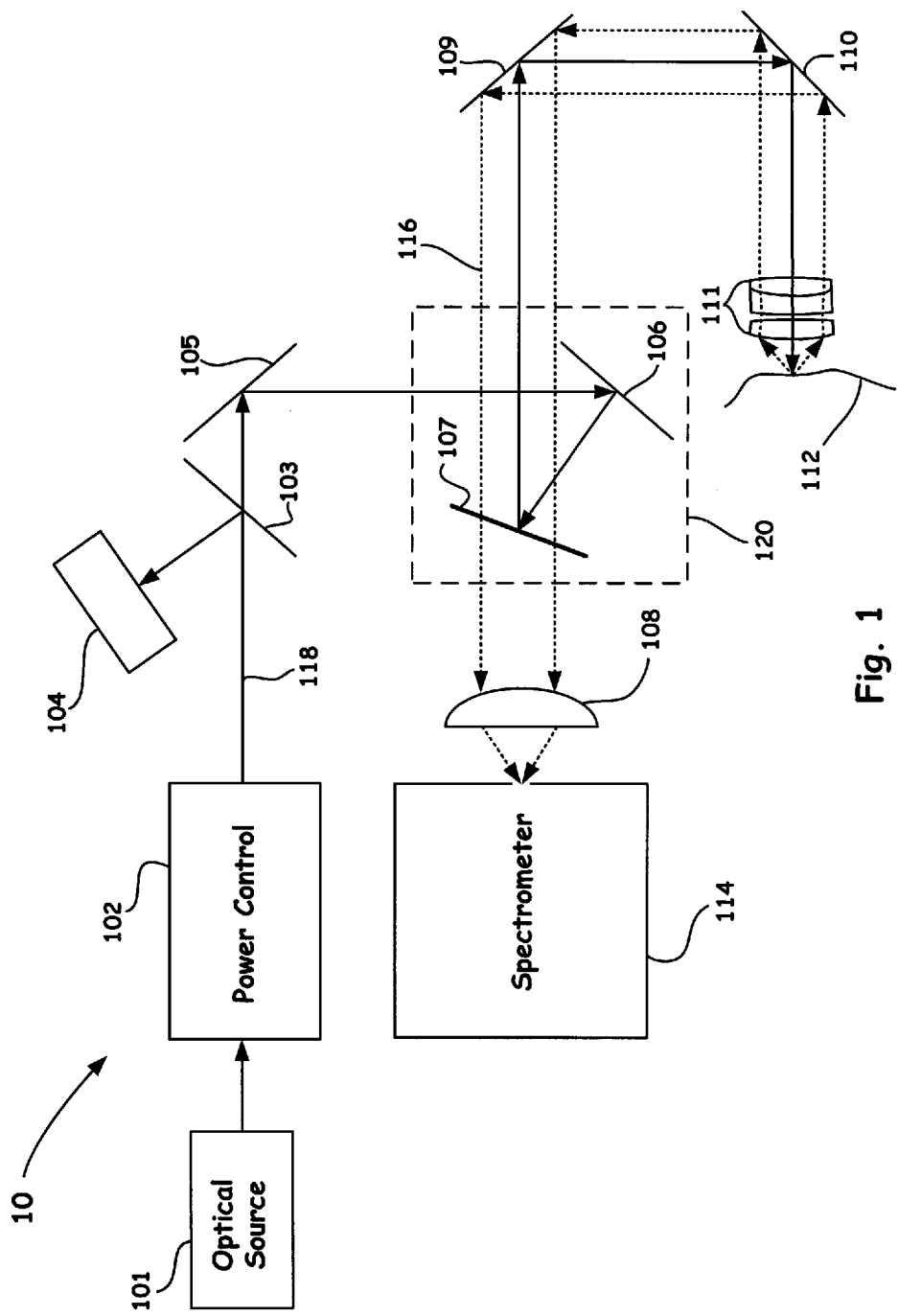
FIG. 1 shows a block diagram of a Raman Scanning system of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

Moreover, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to an accurate application of optical power at a desired sample plane on an instrument that enable users to change lasers, filter sets, objectives, and other sampling optics, with automated recall of necessary calibration parameters. The present invention disclosed herein also measures the actual output power of the laser so as to monitor its lifetime. The spectrometer system that includes coupled commercial or custom software thus provides a user friendly environment for selecting a desired laser power and substantially applying the desired laser power at a sample. The spectrometer system of the present invention thus automatically adjusts the output power of the laser accordingly, either by controlling injection current, using a tunable filter, or some other control means that is known and understood by those of ordinary skill in the art.

Calibration factors for individual optical elements or for groups of optical elements of the present invention can be stored in the following ways:

1. Nonvolatile memory device on the optical element itself, allowing the spectrometer system of the present invention to automatically recognize the device and load respective calibration parameters.

2. Entering the selection of a device into a user interface of the spectrometer, allowing recall of calibration parameters from a machine readable/accessible medium such as, but not limited to, a computer disk.

3. Storage of overall calibration factors in a nonvolatile memory device on the spectrometer system itself, for example, to account for the calibration of secured components that an operator does not change.

4. Storage of estimated calibration factors based on statistical data collected from multiple units, and controlled in the manufacturing process.

Specific Description

Turning now to the drawings, FIG. 1 shows a Raman spectrometer system of the present invention, generally designated by the reference numeral 10, which can beneficially utilize stored calibrated optical wavelength characteristics to control and/or display an applied power to a desired sample plane. The output of an optical source 101, such as a high powered white light source of constant or known emissivity, but more often a laser is utilized to induce a desired emission) e.g., Raman emission) from a sample. When configured from a laser source, it is to be appreciated that the laser can be any commercial device capable of conforming to the design parameters of the present invention. In particular, such a laser is desired to have an output intensity that is designed to direct at least about 10 mW to a sample plane, often between about 10 mW and about 15 mW to a sample plane, coupled with illumination wavelengths greater than about 500 nm. Representative devices include, but are not limited to, a 780 nm diode laser, a 633 nm HeNe laser, and/or a 532 nm solid state laser.

Whatever the chosen optical source 101, the directed optical power is capable of being manipulated via a power control unit 102, which allows for automatic adjustment of the optical power incident on a sampling optic, e.g., a beam-splitter 103. The power control unit 102 can be any form of electrical, optical, and/or mechanical control means to provide for a desired optical power directed by optical source 101. For example, power control unit 102 can include polarizing elements and corresponding optical components such as waveplates and beam-splitters, as known to those of ordinary skill in the art, to manipulate the output of optical source 101 and thus control the directed intensities. Other example arrangements include controlling a tunable laser, such as modulator design laser (i.e., Mach Zehnder) or an optical gated laser structures, such as, but not limited to, distributed Bragg devices, via communication lines (not shown) from the power control unit 102 to the optical source 101. Another arrangement can include controlling the injection current in an optical source, such as, for example, a laser diode, also via communication lines (not shown) from the power control unit 102 to the optical source 101. Another possible arrangement includes a tunable filter, such as, a variable density filter capable of being rotationally or linearly inserted into the beam path within the structure of power control unit 102 shown in FIG. 1 by way of conventional motorized means (e.g., stepper motors).

Specifically, power control unit 102 is arranged to provide a desired intensity along beam path 118 (denoted by a darkened line and accompanying arrows). A portion of the laser output along beam path 118 is directed to a monitoring detector 104 via a calibrated beam-splitter 103, such as, but not limited to, a glass window with anti-reflective coatings for predetermined wavelengths on both sides, an uncoated window, or even a multi-layer dielectric mirror, to sense the optical power of the light that is to eventually illuminate a desired sample 112. It is to be appreciated that monitoring detector 104, often configured with appropriate attenuating optics (not shown), such as, calibrated neutral density filters to hold the optical power within the linear range of the device, can be selected from any number of suitable photo-detectors. Such a representative device can include, but is not limited to, a silicon or a germanium photodiode, an avalanche photodiode, a vacuum photodiode, a photomultiplier tube, a p-n photodiode, and a p-i-n photodiodes. While an example single detector 104 is shown as a beneficial arrangement in FIG. 1 other example configurations may also include an array (e.g., a CCD array) or other plurality of photo-detectors coupled in parallel to enhance the capabilities of the present invention.

The monitoring detector 104 is in optical and/or electrical communication (e.g., wireless, I2C (Inter-Integrated Circuit), SPI (Serial Peripheral Interface), and/or RS232) with the power control unit 102 and a corresponding integrated processor/microcontroller/and/or computer system (not shown) so as to manipulate the optical power along beam path 118 based on a desired energy requirements resulting from calibration parameters. The monitoring detector 104 is thus often configured with a sensing means (e.g., a photo-detector or a current sensing resistor) that correlates an induced signal (e.g., an electrical current) to the sensed optical signal received by monitoring detector 104. Such an arrangement, in addition to being beneficial during calibration procedures, provides a feedback signal to the system controls (e.g., the corresponding integrated processor/microcontroller and/or computer system (not shown)), to monitor, in-situ, signals indicating or representing the amount of desired power to be directed along the beam path 108.

Turning back to FIG. 1, a first pair of mirrors 105 and 106, such as, but not limited to, commercial first-surface plane mirrors with a highly reflective metal coatings or commercial multi-layer dielectric coated broadband mirrors, are configured to direct the optical power received through beam-splitter 103 to an edge filter 107. The edge filter 107 is often a dichroic edge filter, more often a notch filter, which is an optical element (often a holographic optical element) designed to reflect illumination wavelengths (e.g., Rayleigh scattered light) while transmitting wavelengths in the region of the Raman spectrum of interest. Edge filter 107, in combination with a second pair of designed mirrors 109 and 110 (e.g., commercial first-surface plane mirrors with a highly reflective metal coatings or commercial multi-layer dielectric coated broadband mirrors), directs the illumination along beam path 118 to a designed optical focusing element 111, often an infinity corrected microscope objective, which is configured to focus the laser to a desired intensity at the sample 112 and induce a Raman radiation. While a multi-component refractive microscope objective is often utilized herein, it is to be understood that any assembly of optical diffractive, refractive and/or reflective components can also be utilized to produce desired focused intensities without departing from the scope of the present invention.

On the return detection path, Raman scattered radiation from the sample is thus collected by the focusing element 111, and directed to the edge filter 107 via the second pair of designed mirrors 109 and 110 along a beam path as denoted by the reference numeral 116 (shown as a dashed pair of lines with accompanying directional arrows). Components of this radiation in a desired wavelength range pass through the edge filter 107 and are focused to an aperture (not shown) as directed by an optical element, such as a refractive focusing lens 108 and interrogated by a spectrometer 114, such as, any commercial spectrometer with a wavelength range suitable for Raman spectroscopy, for analysis.

The monitoring detector 104 is calibrated at each of several laser wavelengths by comparison of its output to a calibrated laser power meter inserted between 103 and 105. Calibration parameters for the detector are stored for subsequent use in a computer, or machine readable/accessible medium, or a nonvolatile memory device as disclosed herein. An estimate of the cumulative optical efficiency of mirrors 105, 106, 109, and 110, is obtained by controlling the reflectivity of such parts in the manufacturing process. Mirror 106 and the edge filter 107, while capable of being individually configured with a respective nonvolatile memory device, are often configured with a nonvolatile memory device that stores calibration values for the assembly, i.e., a "filter block" assembly 120 (shown within a dashed box) to enable simple interchange with other pre-calibrated filter block assemblies. To provide for pre-calibrated filter block assemblies 120, laser power is measured at the position of mirrors 103 and 109 and such values are stored in a respective nonvolatile memory device for subsequent use. Objectives also receive a calibration factor that is stored on a respective nonvolatile memory device based on statistical analysis of multiple units. Alternatively, individualized calibration factors can be obtained by measuring the power at the sample plane 112, with and without the objective in place, using a power meter with, for example, an integrating sphere detector, i.e., an optical device that can measure introduced uniform optical power that is nearly independent of the spatial and polarization properties of the introduced light. Accordingly, when the system 10 is reconfigured by the user (exchanging the laser, filter block, any mirror, or objective, etc.), it recalls a set of calibration parameters for any identified component or combination of components, and combines them to generate an overall calibration of detector 104, so as to represent a desired laser power at the sample.

It is to be appreciated that a utilized computer (not shown) of the present invention is equipped with a custom or commercial control system, often comprising a graphical user interface (GUI) environment, so as to operate in an efficient and user friendly manner. The computer system (not shown) coupled with such control software of the present invention is thus configured to utilize user input and/or stored statistical produced calibration values, but more often configured to exchange data, such as, for example, optical characteristic/calibration values from one or more nonvolatile memory devices, e.g., devices that can retain the stored information even when not powered.

Representative nonvolatile memory devices can include, but are not strictly limited to, read-only memory (ROM), flash memory, magnetic tape, electrically programmable read only memory (EPROM), and/or electrically erasable programmable read-only memory (EEPROM), any of which can be coupled to selected components illustrated in the example arrangement of FIG. 1. Storing the calibration data in such nonvolatile memory devices coupled to such components allows stored calibration data to be preserved even when the individual optical components are detached from the system, such as the example system 10 shown in FIG. 1, as may occur during storage and/or shipment.

Alternatively, calibration parameters/instructions may be stored and thus retrieved from a machine-accessible and/or machine-readable medium. In particular, machine-accessible and/or machine-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software. Such a medium can thus include, but is not strictly limited to, a floppy disk, a flash drive, an optical compact disc (for example a CD-ROM), a magnetic disc, an optical storage disk, a magneto-optical disk, read-only memory (ROM), electrically programmable-read-only memory (EPROM), electrically erasable programmable read-only-memory (EEPROM), and random access memory (RAM). As yet another option, some or all of the calibration information may optionally be implemented in hardware, such as, for example, circuitry. A medium may also include an electrical, optical, acoustical, radiofrequency, or other form of propagated signal, such as modulated data signals, carrier waves, infrared signals, ultra-wideband, digital signals, etc. Such a signal medium may be downloaded as a computer program product, wherein the program may be transferred from one machine to another machine by way of data signals embodied in a carrier wave or other propagation signal or medium via a communication link (e.g., a modem or network connection).

In a beneficial embodiment, calibration data can be stored as follows: Each optical source 101, as shown in FIG. 1, can be configured with a nonvolatile memory chip that can be sensed by the system of FIG. 1 to determine its wavelength and overall power rating. The wavelength is used to choose a set of wavelength-dependent calibration parameters for other components, and the power rating allows comparison with the measured power to gauge the lifetime of the laser. Power control unit 102, beam-splitter 103, detector 104, mirrors 105, 109, and 110, are removeably installed on the system 10. One or more nonvolatile memory devices (not shown) configured on system 10 can store wavelength-dependent calibration factors for a component or for the cumulative effect of such components.

Each filter block 120 can also be coupled to a nonvolatile memory device that is sensed by the system, as shown in FIG. 1, to identify its cutoff wavelength and calibration factor. Objectives don't have individually stored calibration factors, but each objective type sold with the instrument has a calibration factor that is determined by statistical analysis of multiple units. This calibration is also controlled in manufacturing. Control software, as briefly discussed above, for operating the spectrometer allows the user to choose an objective type, whereupon appropriate calibration factors are loaded into the instrument.

A method of operation for calibrating an instrument and its components, wherein such a process can be used to set up an entire system 10, or to set up individual components that are made for installation by the user in an existing instrument are as follows: At each laser wavelength available for the spectrometer, an appropriate laser is installed on the spectrometer. A calibrated laser power meter head is inserted between 103 and 105. The spectrometer compares the measured laser power with the reading from detector 104, and stores a calibration factor in the nonvolatile memory on the spectrometer. A special filter block is built up with a mirror instead of the edge filter. The power meter head is used to measure power "before" and "after" this filter block, and again, after mirror 110. These measurements allow an estimate of the cumulative optical efficiency for components that are permanently installed on the spectrometer. Each filter block is for a specific laser wavelength. At that wavelength, its cumulative efficiency is measured by inserting the power meter head "before" and "after" the filter block. The calibration factor is stored on the nonvolatile memory chip attached to the filter block. Objectives are characterized by collecting data over multiple units, using power meter with integrating sphere head to measure power with and without the objective. Based on such data, confidence limits are established to allow control of optical efficiency in subsequent manufacturing. For instance, objectives that fall outside of the confidence limit could be rejected. The instrument periodically checks the data on nonvolatile memory chips attached to the above components. If it detects that a component has changed, then it loads new parameters from each of the components in the system.

Figure 2:
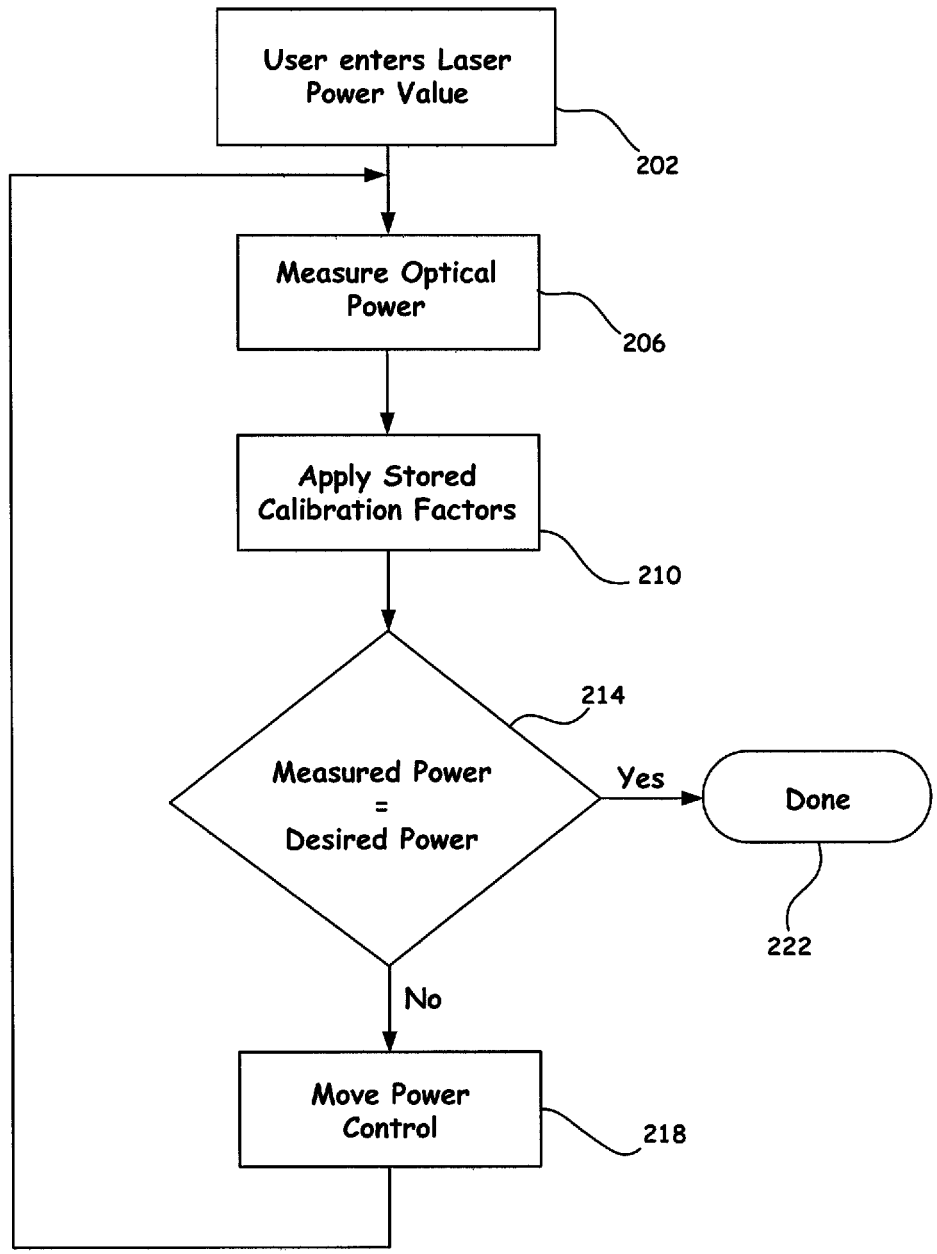
FIG. 2 shows a flow chart diagram of a calibration method in accordance with embodiments of the present invention

FIG. 2 shows an example flowchart for an algorithm that controls the laser power based on a power value entered by the user. In such a method of operation, a user can enter a desired power value in block 202. The system 10 of FIG. 1 is then directed to measure the optical power, as illustrated in block 206, via monitoring detector 104, as shown in FIG. 1. The calibration information parameters are then read from user input values and/or stored statistical values from a machine-accessible and/or machine-readable medium or otherwise accessed from nonvolatile memory based on individual calibrated components or groups of components and applied in the algorithm, as shown in block 210 of FIG. 2. As a result of such applied information, instructions can be executed by the processor/microcontroller/and/or computer in block 214 to decide if the measured power coupled with calibration parameters is equal to the desired power as input by a user, as shown in block 202. If such measured values having calibration parameters applied to such values and desired values are equal, the desired function is done, as shown by the flowchart termination symbol 222. If not equal, the computer system can include instructions that if and/or when executed cause the computer system to select the desired optical power, as shown in block 218 of FIG. 2, by manipulating control unit 102, as shown in FIG. 1, via configured electrical, and or optical communication lines.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention, as defined by the following claims.

The invention claimed is:

1. A Raman spectrometer system for automatically displaying and substantially controlling a desired power at a sample plane, comprising:
   one or more secured optical components and one or more inter-changeable optical components configured along an optical path of said Raman spectrometer system;
   one or more nonvolatile memory devices coupled with one or more of said secured and one or more of said inter-changeable optical components, wherein said one or more nonvolatile memory devices coupled with said one or more of secured and one or more of said inter-changeable optical components further comprise a data set of respective optical characteristics of an individual or a group of said one or more secured and said one or more inter-changeable optical components;

computer means configured to download said data set of respective optical characteristics; and a detector configured to monitor in-situ an optical power input into the optical path of said Raman spectrometer system, wherein said computer means while in feedback communication with said detector adjusts the input optical power based on said data set of respective optical characteristics so that the accurate optical power at a desired sample plane is displayed and automatically controlled for said spectrometer system.

2. The apparatus of claim 1, wherein said computer means is additionally configured to download a stored said data set of respective optical characteristics of said individual or said group of said one or more secured and said inter-changeable optical components from at least one machine readable/accessible medium selected from: a floppy disk, a flash drive, an optical compact disc, a magnetic disc, an optical storage disk, a magneto-optical disk, a read-only-memory (ROM), an electrically programmable-read-only-memory (EPROM), an electrically erasable programmable read-only-memory (EEPROM), a hardware circuitry, and a random access memory (RAM).

3. The apparatus of claim 1, wherein said computer means is additionally configured with a user interface to enable an operator to select calibrated and stored optical characteristics of specific said one or more secured optical components and said one or more inter-changeable optical components so that the optical power at a desired sample plane can be displayed and substantially controlled for said spectrometer.

4. The apparatus of claim 1, wherein said data set of respective optical characteristics of said individual or said group of said one or more secured and said inter-changeable optical components further comprises stored estimated calibration factors based on statistical data collected from multiple units.

5. The apparatus of claim 1, wherein said one or more of secured and said one or more of said inter-changeable optical components comprise components selected from: an optical illumination source, a power control unit, an optical objective, a reflector, an optical filter, a sampling optic, or a spectrometer.

6. The apparatus of claim 5, wherein said power control unit comprises at least one optical component selected from: a polarizer, a wave-plate, a beam-splitter, and a tunable filter.

7. The apparatus of claim 5, wherein said optical source further comprises a laser.

8. The apparatus of claim 1, wherein said one or more inter-changeable optical components comprises an optical filter block that further comprises a notch filter and a reflector.

9. A Raman method for automatically controlling and displaying the power at a desired sample plane for a Raman spectrometer system, comprising:

obtaining a respective data set that comprises optical characteristics of one or more secured optical components and one or more inter-changeable optical components to be utilized in said Raman spectrometer system;

storing said respective data set of said optical characteristics within at least one machine readable/accessible medium as coupled to said one or more secured optical components and one or more inter-changeable optical components, said at least one machine readable/accessible medium being selected from: a floppy disk, a flash drive, an optical compact disc, a magnetic disc, an optical storage disk, a magneto-optical disk, a read-only-memory (ROM), an electrically programmable-read-only-memory (EPROM), an electrically erasable programmable read-only-memory (EEPROM), a hardware circuitry, and a random access memory (RAM);

reading said respective data set from said at least one machine readable/accessible medium; and monitoring in-situ an optical power input into said Raman spectrometer system, wherein said monitored input optical power is adjusted in a feedback controlled operation based on said read data set of respective optical characteristics of said one or more secured optical components and one or more inter-changeable optical components so that the accurate optical power at a desired sample plane is displayed and automatically controlled for said spectrometer system.

10. The method of claim 9, wherein said obtaining step of said data set of respective optical characteristics of said individual or said group of said one or more secured and said inter-changeable optical components comprises: storing estimated calibration factors based on statistical data collected from multiple units.

11. The method of claim 9, wherein said reading step further comprises: allowing said spectrometer system to automatically identify said one or more secured optical components and said one or more inter-changeable optical components so that said respective data set of said optical characteristics are downloaded from said at least one machine readable/accessible medium.

12. The method of claim 9, wherein said reading step further comprises: reading stored estimated calibration optical characteristics based on statistical data collected from multiple units that comprise said secured optical components and said one or more inter-changeable optical components.

13. The method of claim 9, wherein said feedback controlled operation further comprises: feedback controlling a power control unit via one or more communication lines.

14. The method of claim 9, wherein said feedback controlled operation further comprises: feedback controlling via one or more communication lines an optical source by way of manipulating the injection current in said optical source.

* * * * *